US009009610B2

(12) United States Patent
Florance et al.

(10) Patent No.: US 9,009,610 B2
(45) Date of Patent: Apr. 14, 2015

(54) METHOD AND APPARATUS FOR MANAGING REAL ESTATE DATA

(75) Inventors: Andrew C. Florance, Washington, DC (US); Bob Evatt, San Diego, CA (US); Scot Bohl, Washington, DC (US); John Merritt, Encinitas, CA (US)

(73) Assignee: CoStar Group, Inc., Washington, DC (US)

( * ) Notice: Subject to any disclaimer, the term of this patent is extended or adjusted under 35 U.S.C. 154(b) by 93 days.

(21) Appl. No.: 13/491,567

(22) Filed: Jun. 7, 2012

(65) Prior Publication Data
US 2013/0332877 A1 Dec. 12, 2013

(51) Int. Cl.
G06F 3/00 (2006.01)
G06F 17/30 (2006.01)

(52) U.S. Cl.
CPC .................. *G06F 17/3087* (2013.01)

(58) Field of Classification Search
CPC .................................. G06F 17/3087
USPC ............. 715/781, 784, 762; 705/14.73
See application file for complete search history.

(56) References Cited

U.S. PATENT DOCUMENTS

| | | | |
|---|---|---|---|
| 6,750,883 B1 * | 6/2004 | Parupudi et al. | 715/763 |
| 7,493,565 B2 * | 2/2009 | Parupudi et al. | 715/744 |
| 7,975,231 B2 * | 7/2011 | Hasuike et al. | 715/760 |
| 8,554,938 B2 * | 10/2013 | Mittal | 709/230 |
| 2004/0183826 A1 * | 9/2004 | Taylor et al. | 345/738 |
| 2007/0124683 A1 * | 5/2007 | Ranin et al. | 715/733 |
| 2009/0031246 A1 * | 1/2009 | Cowtan et al. | 715/786 |
| 2009/0132316 A1 * | 5/2009 | Florance et al. | 705/7 |
| 2009/0182681 A1 * | 7/2009 | Bloomfield | 705/80 |
| 2009/0254841 A1 * | 10/2009 | Balaishis et al. | 715/753 |
| 2009/0265323 A1 * | 10/2009 | Balaishis et al. | 707/3 |
| 2009/0271718 A1 * | 10/2009 | Balaishis et al. | 715/760 |
| 2010/0145829 A1 * | 6/2010 | Bloomfield | 705/27 |
| 2012/0054616 A1 * | 3/2012 | Mittal | 715/722 |
| 2012/0159388 A1 * | 6/2012 | Chalouhi et al. | 715/810 |
| 2012/0265633 A1 * | 10/2012 | Wohlstadter et al. | 705/26.3 |
| 2013/0073400 A1 * | 3/2013 | Heath | 705/14.73 |
| 2013/0174085 A1 * | 7/2013 | Pearsall et al. | 715/784 |
| 2013/0254670 A1 * | 9/2013 | Eraker et al. | 715/738 |

* cited by examiner

*Primary Examiner* — William Titcomb
(74) *Attorney, Agent, or Firm* — Marc S. Kaufman; Reed Smith LLP

(57) ABSTRACT

A system and method for managing real estate data using a mobile device, such as a tablet computer. The data is displayed in a manner that facilitates quick analysis suing a mobile device. User interfaces, processing, and other features provide a mobile user with information required to make intelligent decisions on real estate transactions. A tour can be constructed based on a subset of data returned as a result of a database query.

9 Claims, 22 Drawing Sheets

| COSTAR GO | | | ⌖ | | Q Search for address, place, name or company | | |
|---|---|---|---|---|---|---|---|
| Property | Lease | Sale | Tenant | Analytic | Demographic | Contact |

1301 K St NW - One Franklin Square
East End Submarket Washington DC 20005
594,431 SF Class A Office Bldg Built in 1990 - 6,301-143,518 SF Avail

★★★★☆

▽ Demographics

| POPULATION | 1 MILE | 3 MILE | 5 MILE |
|---|---|---|---|
| 2011 Total Population | 55,391 | 329,387 | 709,424 |
| Pop growth 2011-2016 | 3.20% | 3.60% | 3.70% |
| Per Capita Income | $50,434 | $46,631 | $44,325 |
| Average Age | 35.70 | 36.50 | 37.20 |

| HOUSEHOLDS | 1 MILE | 3 MILE | 5 MILE |
|---|---|---|---|
| 2011 Total Households | 31,183 | 159,131 | 325,020 |
| HH Growth 2011-2016 | 4.60% | 4.50% | 4.50% |
| Median Household Inc | $53,457 | $61,496 | $63,746 |
| Avg Household Size | 1.60 | 1.91 | 2.06 |
| Avg HH Vehicles | .60 | .80 | .90 |

| HOUSING | 1 MILE | 3 MILE | 5 MILE |
|---|---|---|---|
| Median Housing Value | $499,391 | $488,064 | $460,194 |
| Median Year Built | 1961 | 1947 | 1953 |

Displaying 1 of 23 Results

CoStar Tour

Thursday's Tour: Property Rating Analysis

[View Comparison Charts] [View Tour Group Average ▷] [Home]

| | Average | Building Quality | | | | Space Quality | | | | Location | |
|---|---|---|---|---|---|---|---|---|---|---|---|
| | | Amenities | Parking | Overall Building Condition | Common Areas | Space Condition | Views | Elevator Exposure | Ceiling Height | Proximity To Clients | Proximity To Employees |
| 555 12th St NW 195,540 SF ★★★☆ | 8 | 9 | 9 | 5 | 5 | 8 | 6 | 8 | 7 | 7 | 8 |
| 650 10th St NW 174,594 SF ★★★☆ | 7 | 8 | 7 | 5 | 8 | 9 | 5 | 8 | 7 | 7 | 8 |
| 1299 Pennsylvania Ave... 169,112 SF ★★★☆ | 7 | 5 | 5 | 8 | 10 | 8 | 4 | 8 | 4 | 5 | 5 |
| 800 10th St NW 174,594 SF ★★★☆ | 6 | 8 | 9 | 7 | 5 | 9 | 7 | 5 | 9 | 8 | 8 |
| 1050 Connecticut Ave NW 168,501 SF ★★★☆ | 5 | 9 | 4 | 9 | 8 | 5 | 9 | 8 | 5 | 10 | 8 |

FIG. 15

METHOD AND APPARATUS FOR MANAGING REAL ESTATE DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

When considering a purchase or lease of real estate, especially commercial real estate, the potential buyer or lessee has to consider a myriad of attributes of the property. Also, comparison between various alternative properties is difficult. One tool that has been used to simplify the process is the concept of "comparables" or "comps", i.e., other properties that have similar attributes that can be used for comparison. While the use of comps is often helpful, it is difficult to determine a group of comparable properties because each consumer may have different needs and thus different attributes that need be considered to determine comparable properties. For example, one consumer may want properties that are near a main street, have storefront access and 10,000 square feet of available space while another consumer may need to be in a specific neighborhood and need 50,000 square feet.

In addition to the common attributes, such as the location and size of the building and the available space, a consumer must consider zoning, tenants, price, appearance of the building, vacancy rates, available transportation, age of the building, amenities, various financial attributes, and many other factors to make the best decision. The decision is so complex that professional brokers and other intermediary models have arisen to assist the consumer. In fact, virtually all commercial real estate transactions involve at lest one intermediary.

Recently, databases have emerged that provide access to real estate information, and commercial real estate information in particular. For example, CoStar™, provides a database that can be searched by various attribute filters to provide listings of properties satisfying the filter attributes. Such databases often include a great deal of textual information about properties and images of the properties and related maps. Brokers and other intermediaries use such databases to discover properties and help clients make decisions thereon. Also, these databases can be accessed via a web interface using a standard browser. However, because of the myriad of data, it has been difficult to present the data in a coherent manner, especially on mobile devices with constrained processing and display resources.

By nature, the search for real estate requires a decision maker, e.g. a broker and their client, to physically visit the various properties. Therefore, the difficulty in accessing data is further complicated in that the decision maker is physically on the move. Typically, a broker will conduct a property search at the office and print out the results to take with them to visit properties with their clients. In the event that the client desires different or more specific information while visiting a property, it is difficult for the broker to obtain the information. While real estate information is available through smartphones, tablets and other mobile devices, current systems do not provide the level of interactivity required by mobile devices to effectively utilize real estate information databases on a mobile device.

BRIEF DESCRIPTION OF THE DRAWINGS

FIG. 4A is a lease detail screen showing lease transaction information.
FIG. 4B is a lease detail screen showing a "stack plan".
FIG. 5 is a sale detail screen.
FIG. 9 is a demographic detail screen.
FIG. 14 is a tour property rating screen.
FIG. 15 is a rating comparison screen.

While systems and methods are described herein by way of example and embodiments, those skilled in the art recognize that the invention is not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

It is known to utilize mobile devices, such as smart phones and tablet computers, to assist in mapping/directions and other informational needs. However, tools for mapping have not been integrated into real estate databases in a manner that allows a user to efficiently retrieve data and absorb that data on a resource constrained device. The disclosed embodiment provides an application front end, i.e. an "app" that allows a user, such as a lessee, purchaser, or intermediary acting on behalf of the consumer, the client, to query a real estate database and manage the presentation of the query results in a convenient manner. The app can run on a mobile client device, such as a smartphone or a tablet computer, and the query results can be presented in a manner that permits ease of viewing, ease of analysis, and ease of transitioning to related data.

Figure 1:
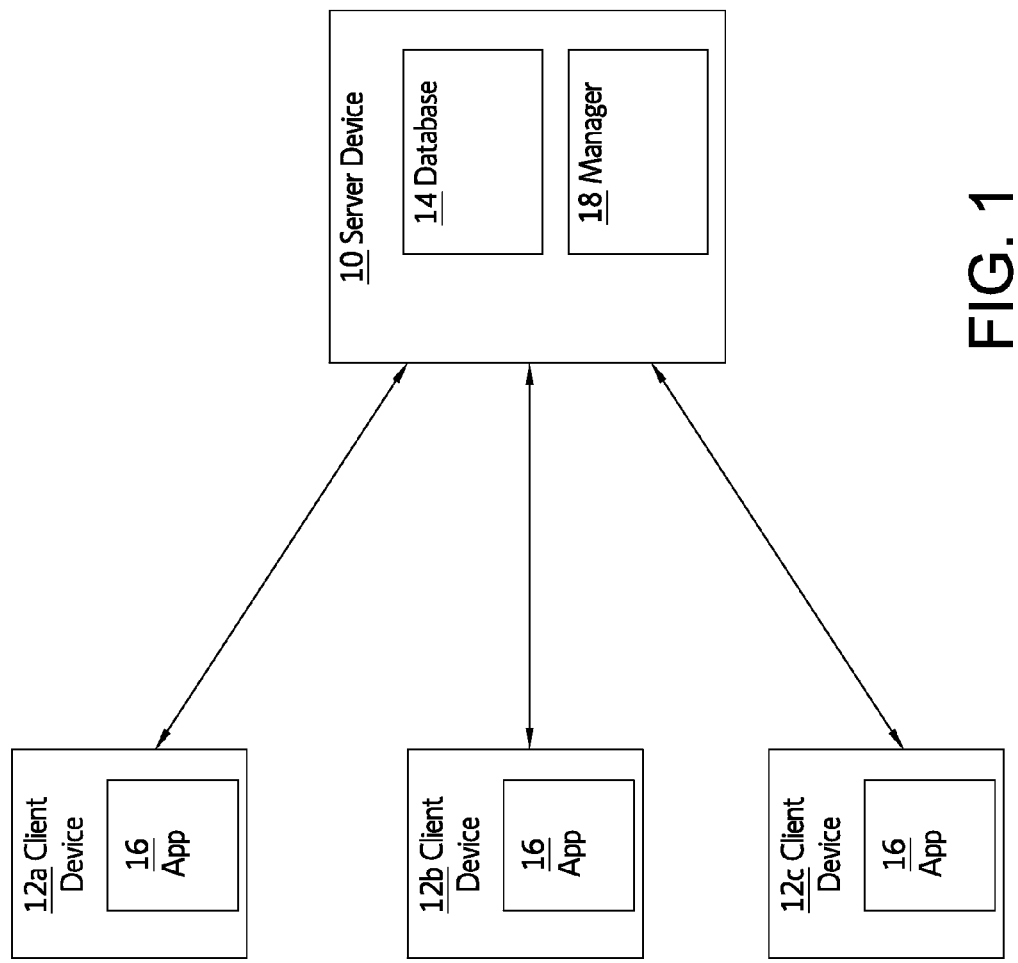
FIG. 1 is a schematic diagram of a computer system of an embodiment.

FIG. 1 illustrates a system in accordance with an embodiment. The system includes server device 10 and one or more client devices 12a, 12b, and 12c, collectively and individually referred to as "client device 12" herein. Of course, there can be any number of server devices and client devices and each device can be composed of one or more devices. As an example, server device 10 can be a server farm of many computing devices and memory devices and each client device 12 can be a mobile device such as a smartphone or a tablet computer. Client device 12 can be communicatively coupled to server device 10 through a network, such as the Internet. The communication connection can include wired and/or wireless links. For example, client device 12 can be coupled to server device 10 through WiFi or a 3G/4G cellular network.

Server device 10 includes database 14 of commercial real estate data, including property records, stored and organized in a known manner. For example, a database such as that described in U.S. Pat. No. 7,640,204 can be used as database 14. Database 14 can also include other information, such as mapping information and contract information, such as lease agreement information, as described below. Database 14 can be composed of plural databases. Also, server device 10 includes process manager 18 which processes queries to database 14 and data returned in response to the queries. Also, process manager 18 can handle the calculation of analytics and other data manipulation, which are described in further detail below.

Each client device 12 has app 16 loaded in a memory thereof. App 16 includes software instructions for facilitating query submission to database 14 presentation of data including data returned in response to queries, and other functions described below. Server device 10 and client device 12 are each one or more computing devices as is well known and include processors, displays, input devices, memory and the like. All functions of the devices are accomplished by software instructions recorded on tangible media and executed by the processors. In the disclosed embodiment, client device 12 includes a touch screen user interface.

Users can access database 14 through a subscription based model, for example. Although the data is described as being contained within a "database," data can be stored in a plurality of linked physical locations or data sources and thus database 14 can include data stored at various location and on various devices. Database 14 can provide a unified data model and a system for forming a variety of queries. Also, database 14 includes all indexes, data structures, and other elements necessary to process queries and return results. For example, database 14 can be a Structured Query Language (SQL) database.

Figure 2:
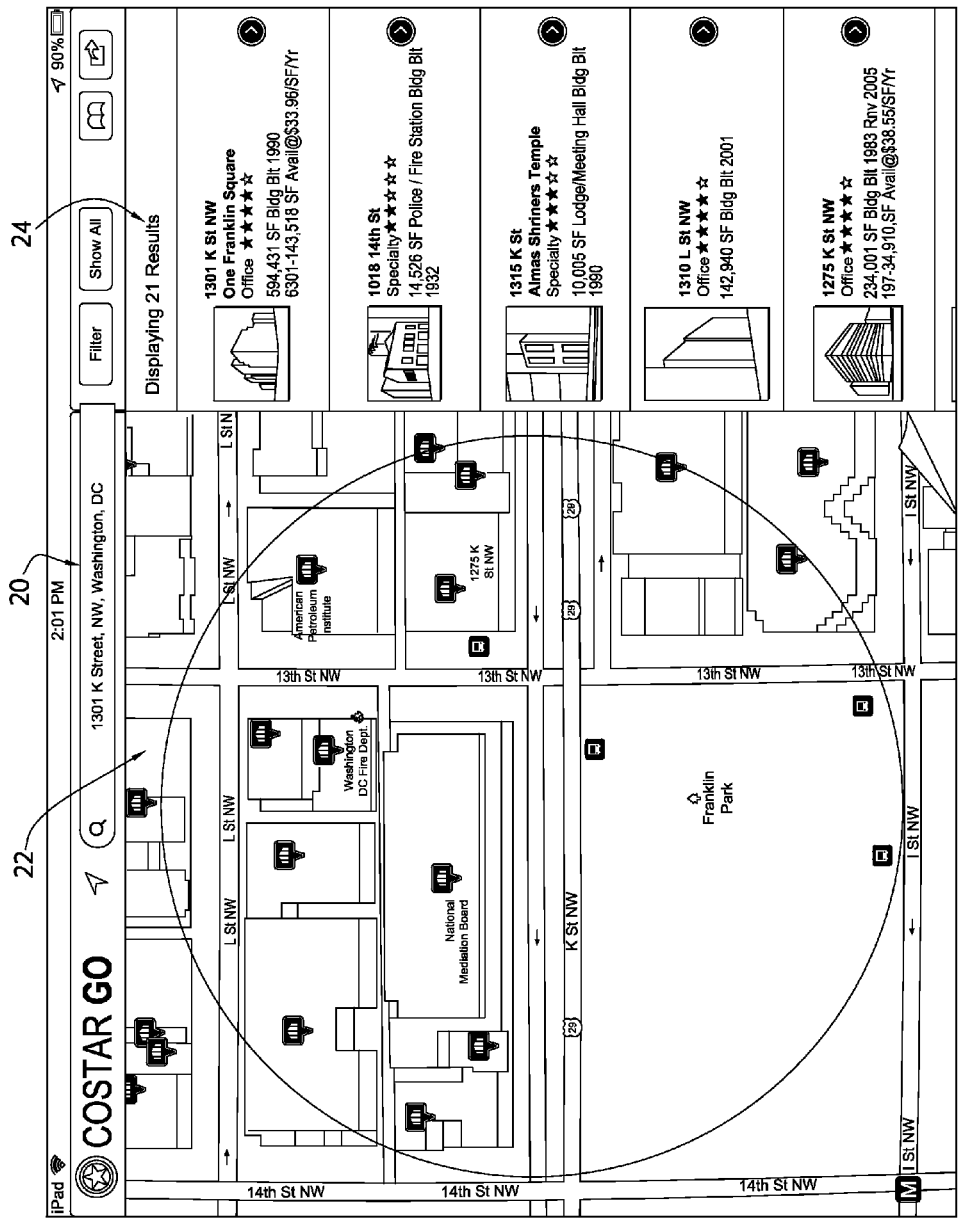
FIG. 2 is a search results screen.

FIG. 2 illustrates a search results screen of an embodiment that is generated by app 16 and displayed on client device 12. A search query, in the form of an address, a neighborhood, or a building name, for example, can be entered into search box 20. In this example, an address was used as the query. Also, various filters, such as For Lease, For Sale, Size, Year Built, Tenants, Zoning, Energy Rating, Building Class, Lease Expiration, Option Type, Hierarchy, Portfolio, Agent/Company/Contact, and the like can be applied at the time of submitting the query or afterward to the results set.

The query is sent to server device 10 and processed by manager 18. Data from database 14 is returned that satisfies the query. The returned results are shown in map window 22 and record window 24. Map window 22 shows icons representing properties corresponding to property records returned as a result of the query. Each icon corresponds to a single property. Note that not all properties satisfying the query need be shown as icons in map window 22. In fact, as described in greater detail below, it is often desirable to limit the number of icons, especially on a mobile device. Record window 24 shows a listing of properties corresponding to property records satisfying the query and related information from the corresponding property records in database 14. In this example, record window 24 shows the address of each property, an image of the property, and related information, such as available square footage and price for the lease or sale of the property. Selection of a property listing from record window 24 can provide more detailed information for that property, such as leasing contact information and other information described below.

Navigation of the screen shown in FIG. 2, and all screens described herein, can be accomplished by touch screen input. For example, a user can scroll down the list of properties in record window 24 by dragging a finger upwards in the window. Selecting a property, by touching the corresponding display area, can place the property at the top of the list in record window 24. If a property is selected for drill down, by double tapping on the touch screen for example, a property detail screen, showing more detailed data from the property record, is displayed.

Figure 3:
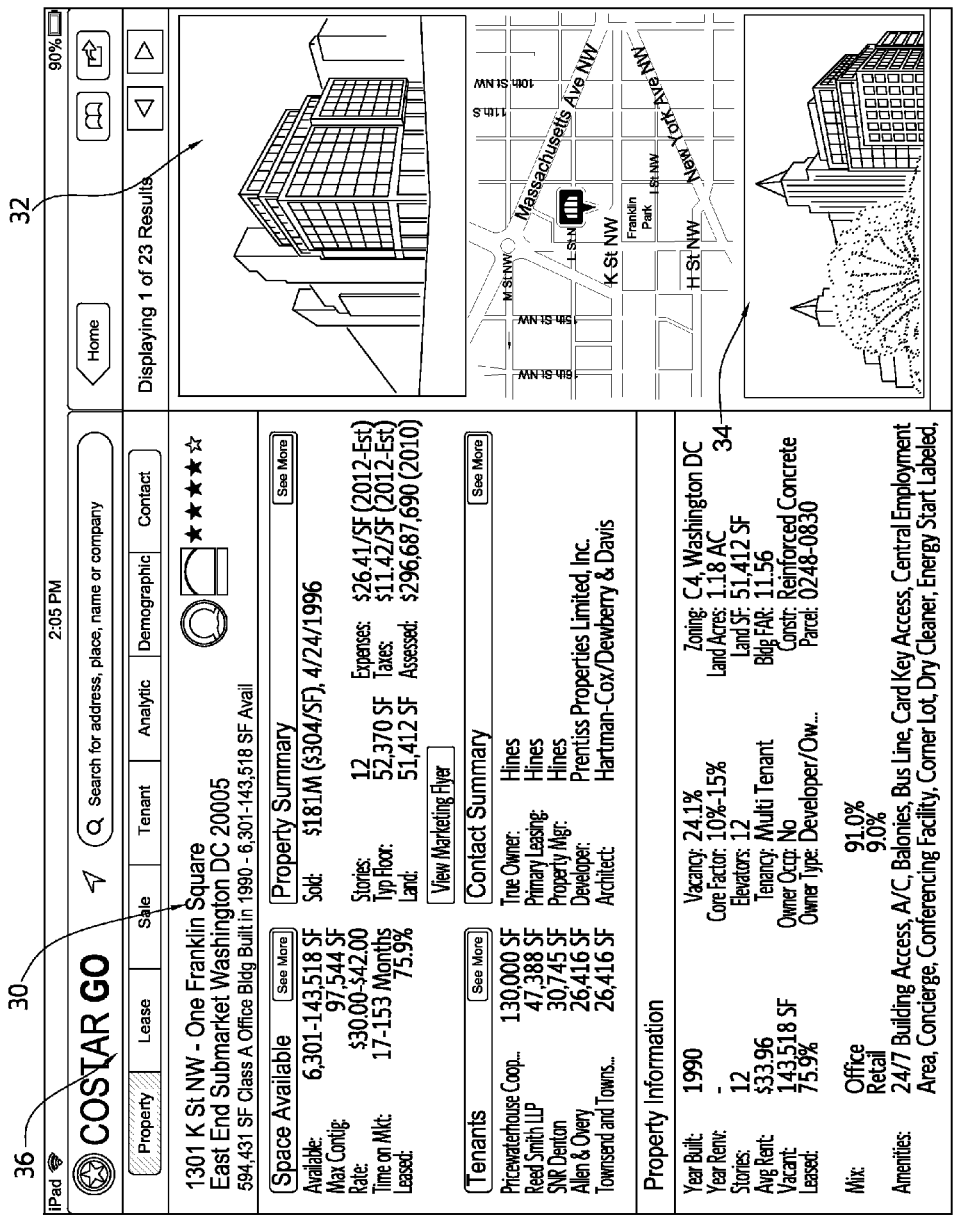
FIG. 3 is a property detail screen.

FIG. 3 illustrates the property detail screen. Property data window 30 displays additional data related to the property, such as whether or not any space is available for lease at the property, square footage, contact information, building details, and the like. Image window 32 displays one or more images of the property and map window 34 displays an icon representing the selected property on a geographic map. Tabs 36 are provide to allow selection of additional detail screens for the same property.

Figure 4A:
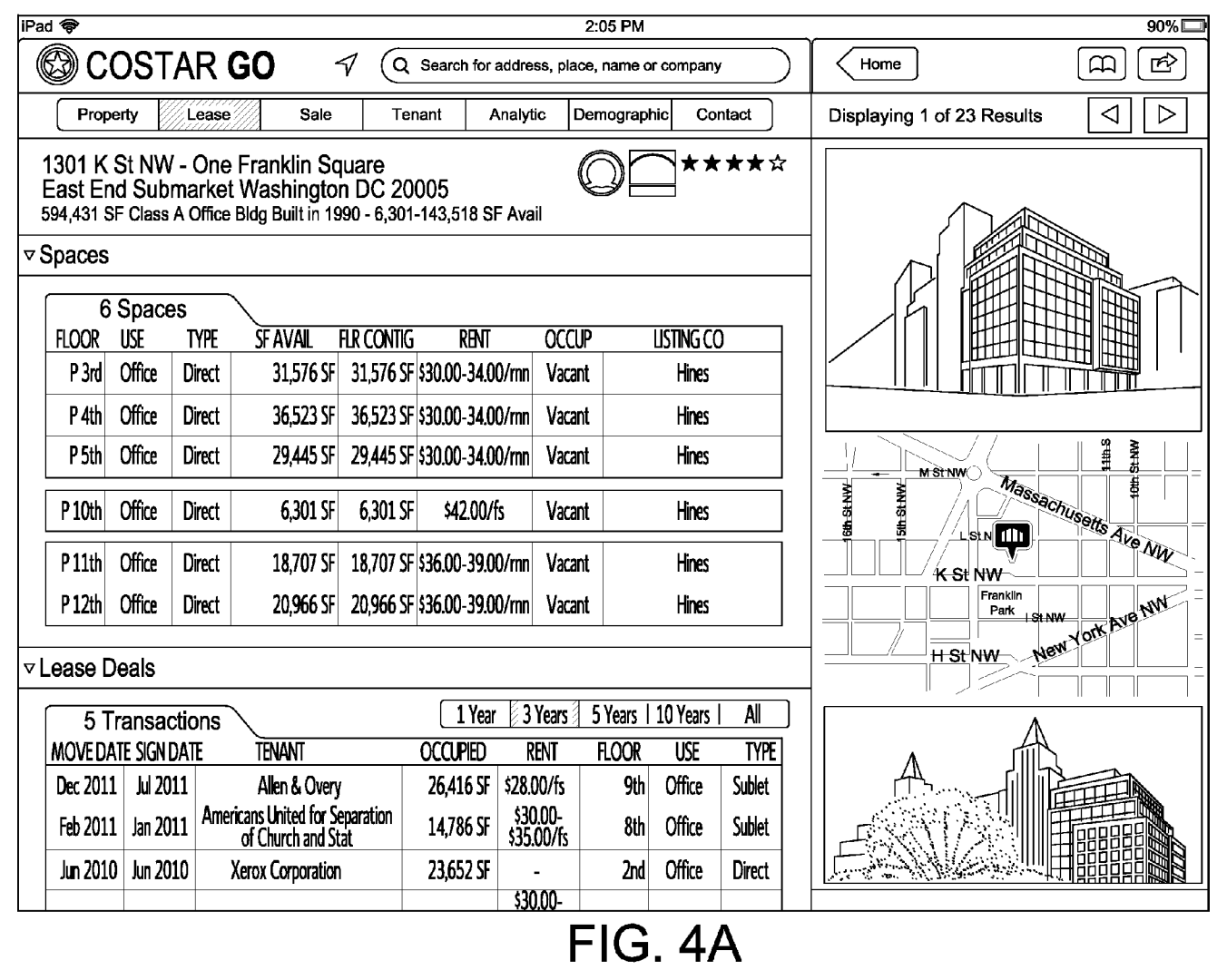

FIG. 4A illustrates a lease detail screen resulting from selecting the Lease tab. This screen shows vacant space in the selected property and various details of the vacant space such as the square footage available, the price, and the leasing agent. Also, recent lease transaction details are shown at the bottom of the screen to allow a potential lessee to better understand the market rate for space in that property.

Figure 4B:
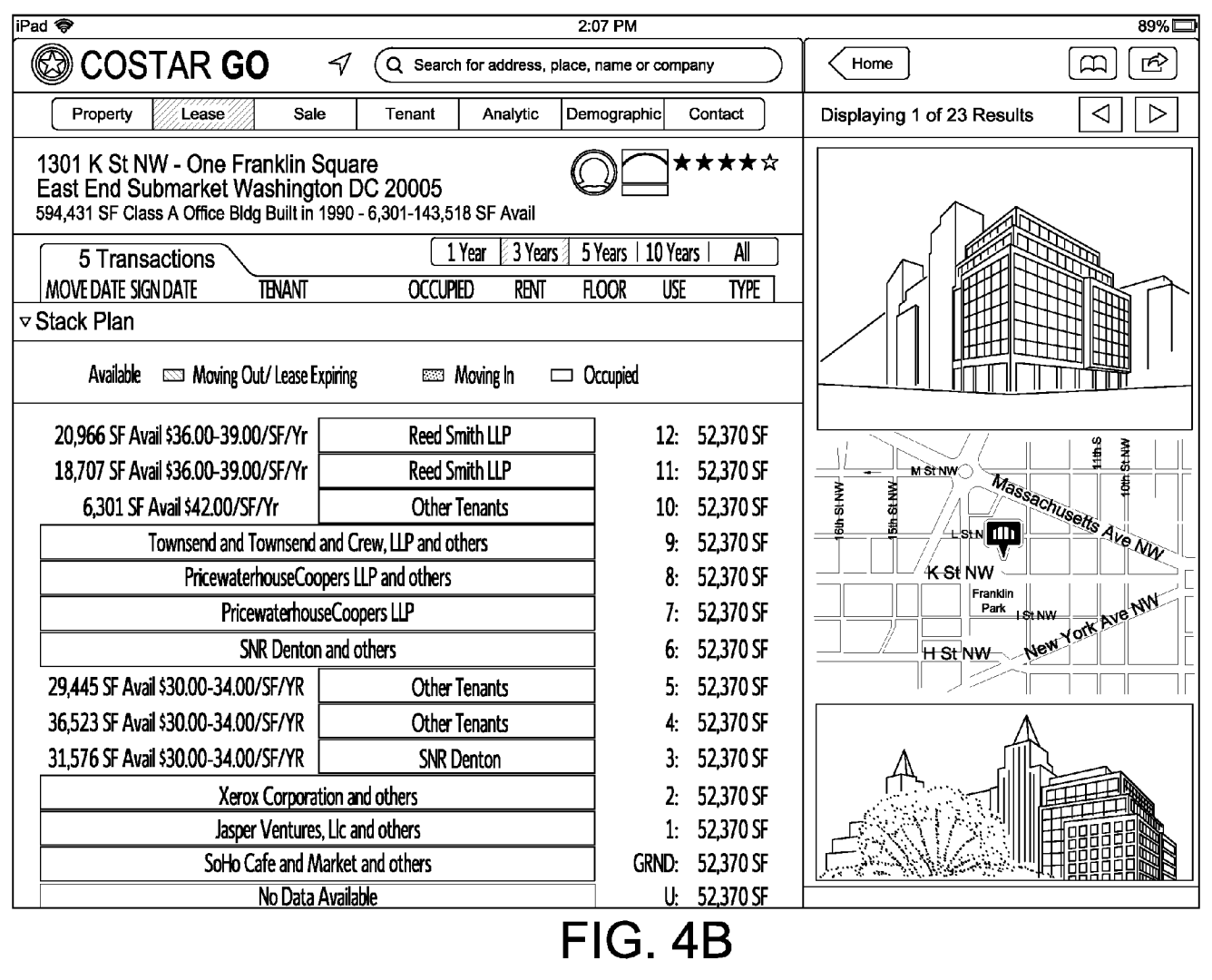

FIG. 4B illustrates a lease detail screen showing a tenant "stack plan". This screen shows the identity of tenants, the square footage they are leasing, and the status of the leases (through color coding), such as whether they are moving in, moving out/lease expired, or whether space is available. Note that the tenants are stacked, in a graphical manner by occupied floor and space on that floor. This allows a potential lessee to quickly and accurately understand the various tenant spaces in the building and to identify contiguous floor space.

Figure 5:
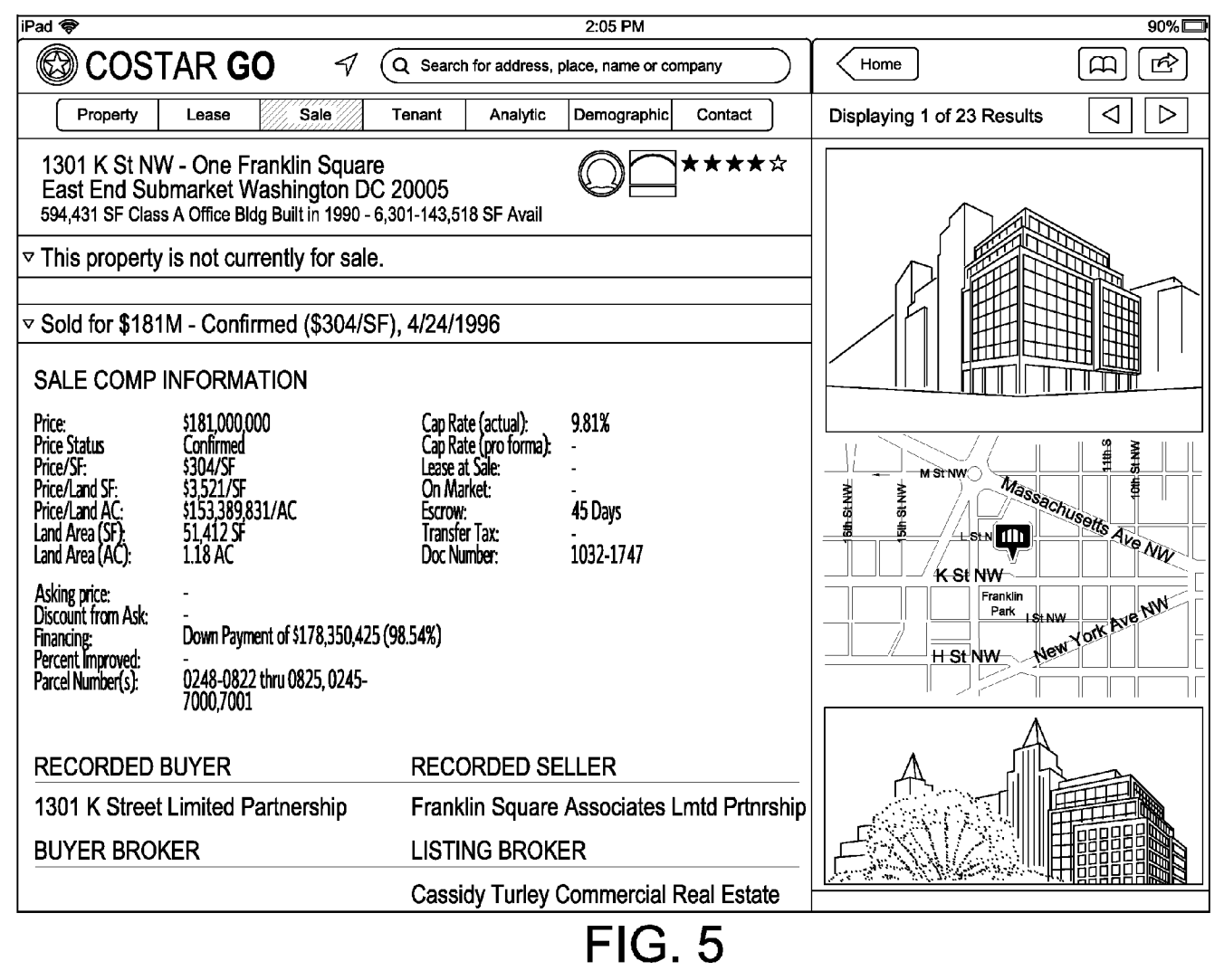
Figure 6:
FIG. 6 is a tenant detail screen.

FIG. 5 illustrates a sale detail screen resulting from selecting the Sale tab of tabs 36. Various details of the recent sale of the property are shown, such as sales price, down payment, and other details of the transaction. FIG. 6 illustrates a tenant detail screen resulting from selecting the Tenant tab of tabs 36. This screen is similar to the lease detail screen except that it shows more detail about the tenants such as industry type and lease expiration dates.

Figure 7:
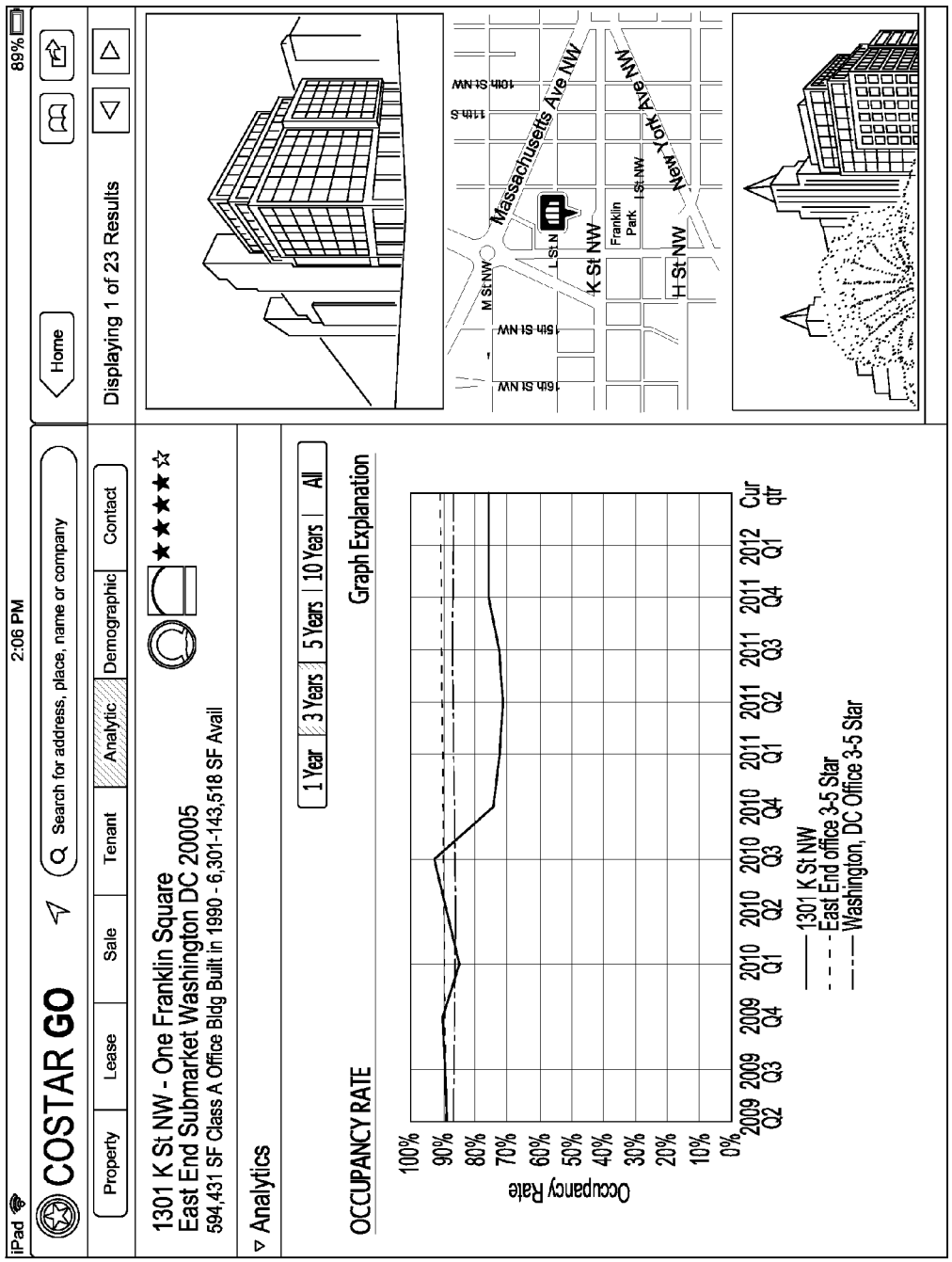
FIGS. 7 and 8 are analytics detail screens.
Figure 8:
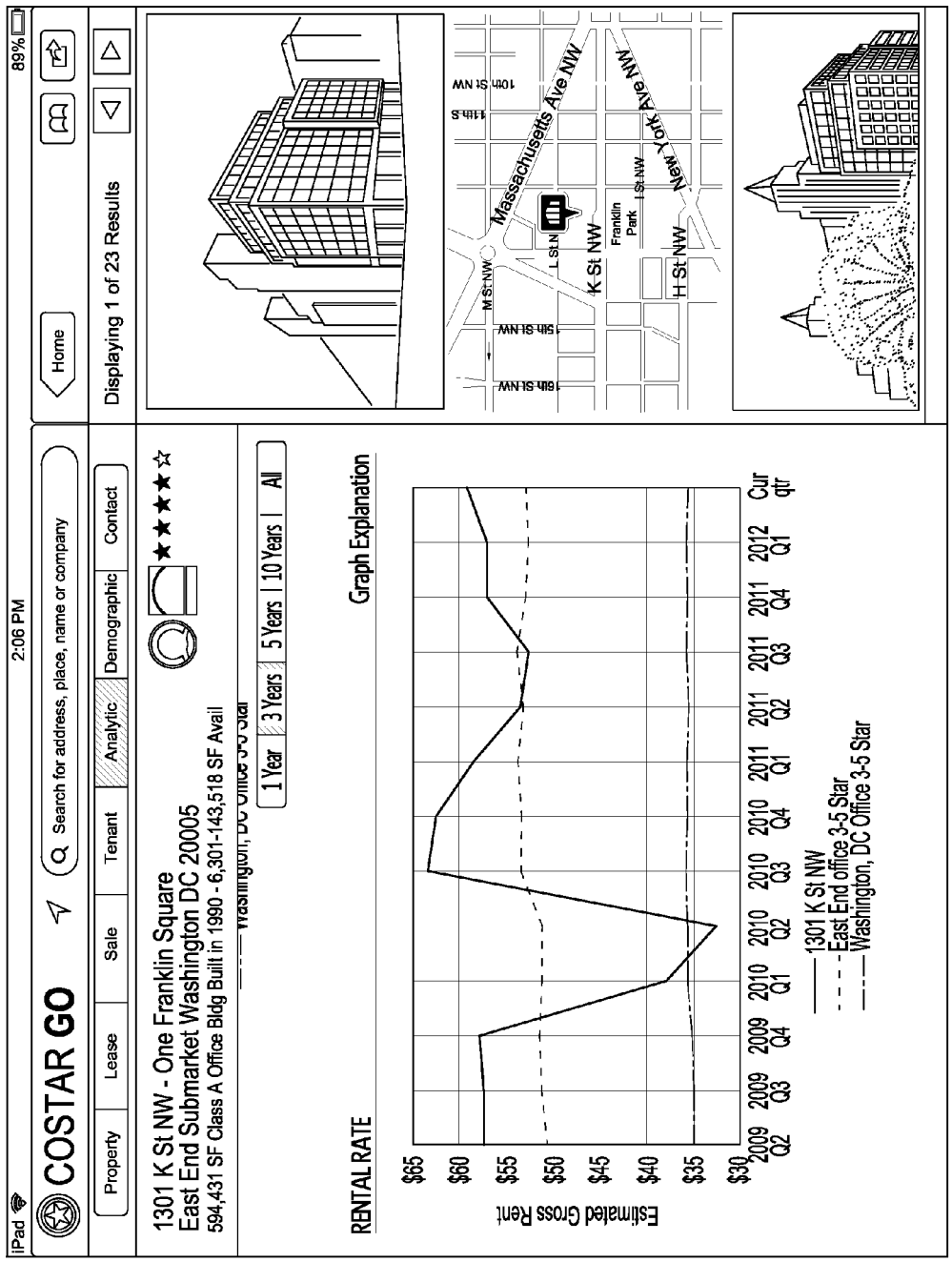

FIGS. 7 and 8 illustrate an analytics detail screen resulting from selecting the Analytics tab of tabs 36. In FIG. 7, the occupancy rate over time is graphed for the property. In FIG. 8, which results from scrolling down in FIG. 7, rental rates for the building, the neighborhood, and the market are graphed over time. Of course, other analytics, such as lease activity, net absorption, local construction activity, comparable sales activity, and occupancy rates, can be graphed versus time or otherwise displayed.

FIG. 9 illustrates a demographic detail screen resulting from selecting the Demographic tab of tabs 36. Note that, from any of the detail screens shown above, a user can scroll through directly to the same screen for another property by swiping horizontally across the touch screen or through buttons 90. It can be seen that a user can navigate to a great deal of relevant data very efficiently using a mobile device and the user interface described above.

Figure 10:
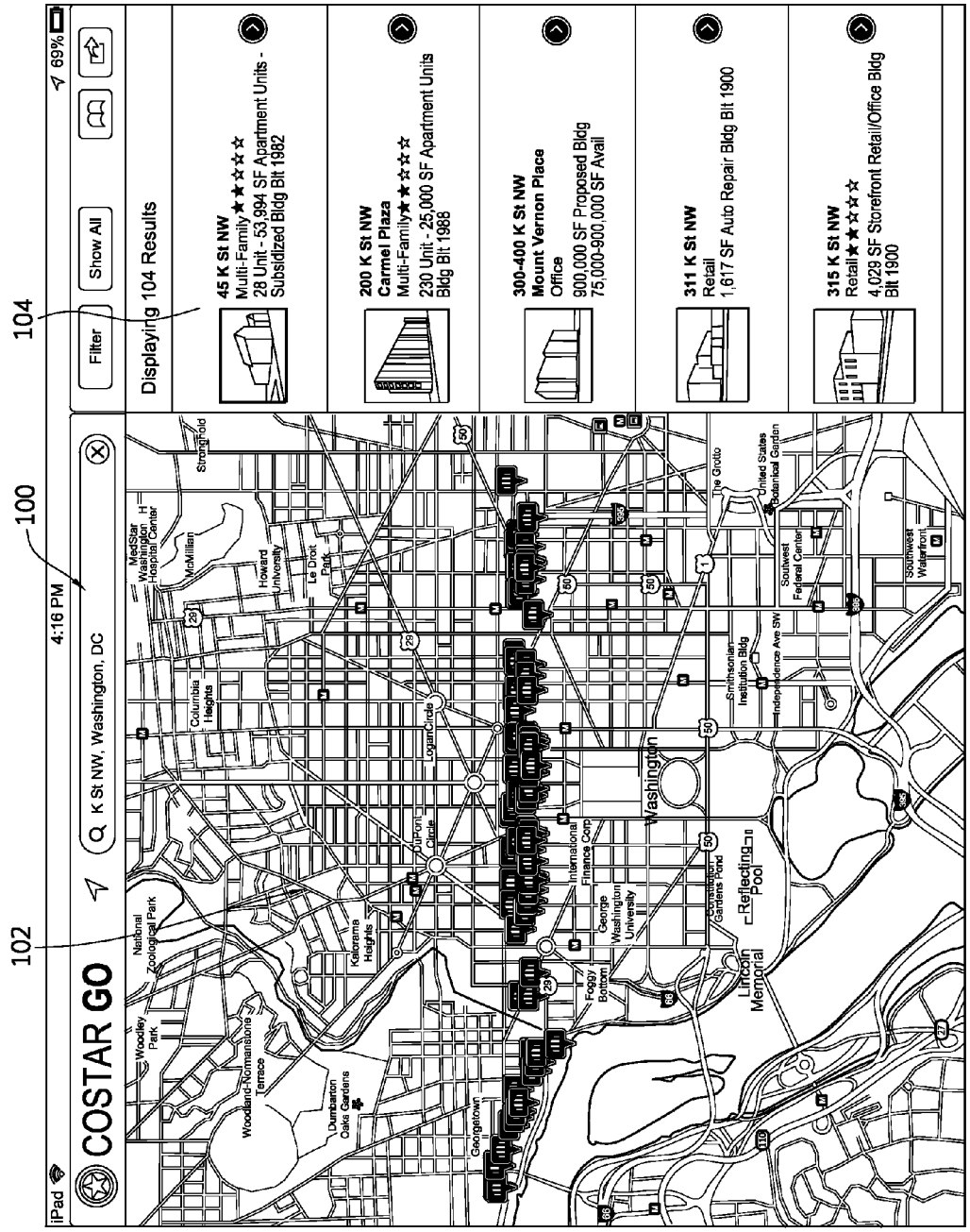
FIG. 10 shows an alternative query.

As noted above, queries can be entered in various ways. FIG. 10 shows an alternative way to enter a query. Query 100 is entered as a street name, without a specific number address. The query results shown in map window 102 represent properties that are along a corridor defined by the street of the query and possibly other parameters, such as dimensions or number of parallel streets away from the street, or distance on either side of the street. In this manner, a user can locate and analyze properties along a corridor, which corresponds more closely to business markets in many cases. Record window 104 shows the results for each property, similar to the description above. Also, navigation can be accomplished in a manner similar to that described above. Of course, filters and sorting options can also be selected and applied to the results. The corridor can be specified through the user interface in various ways. For example a user can draw a single line, or box on the touch screen with one finger, or parallel lines with two fingers. Changing the width of the corridor changes the displayed results.

Figure 11:
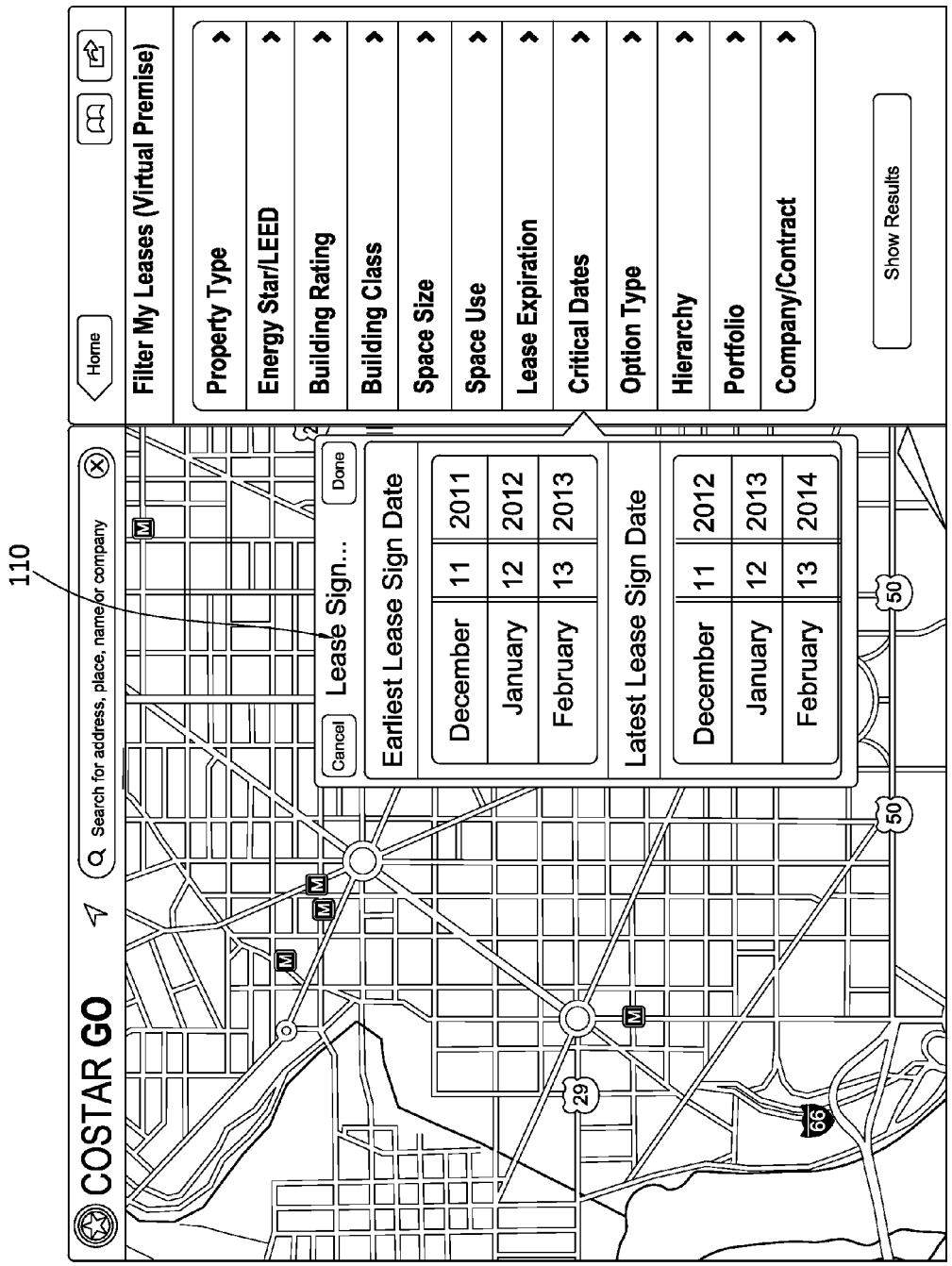
FIG. 11 shows a user interface for entering critical dates for a query.

FIG. 11 shows the application of a Critical Dates filter to a search query or to search results. Selectors 110 can be used to select a Lease Expiration filter. Selecting this filter can map, in a map window, properties that have a lease expiring soon. This filter can be combined with the Critical Date filter to map properties having a lease expiring in a selected date window, for example early in the next year. Selectors 110 can also be used to select an Earliest Lease Sign Date and/or a Latest Lease Sign Date. The filtered results will only include properties having available space in those dates. Of course, a critical date filter can apply to any date related attribute, such as a Sale, Year Built, or Year Renovated. Of course, database 14 can include contract terms, such as lease terms to permit such filtering and display. This data is cross referenced with map data and other real estate data to provide a unique display of properties.

Other filters include Building Rating, Building Size, Energy Star/LEED, Building Class, Space Size, Space Use, Rent/Sq. Footage/Year, Lease Sign Date, Lease Term, Lease Type, Year Built/Renovated, Company/Contact, and the like. These filters can be selected and a particular rating, size or other relevant parameter can be specified through a user interface. Further, when a specific property is selected for display through selection in the map window or the records window, or any other user interface mechanism, a size and/or rating button can be selected and buildings having a same and/or similar size/rating will be displayed. Of course, these filters can be combined with any other filters or search parameters.

Figure 12:
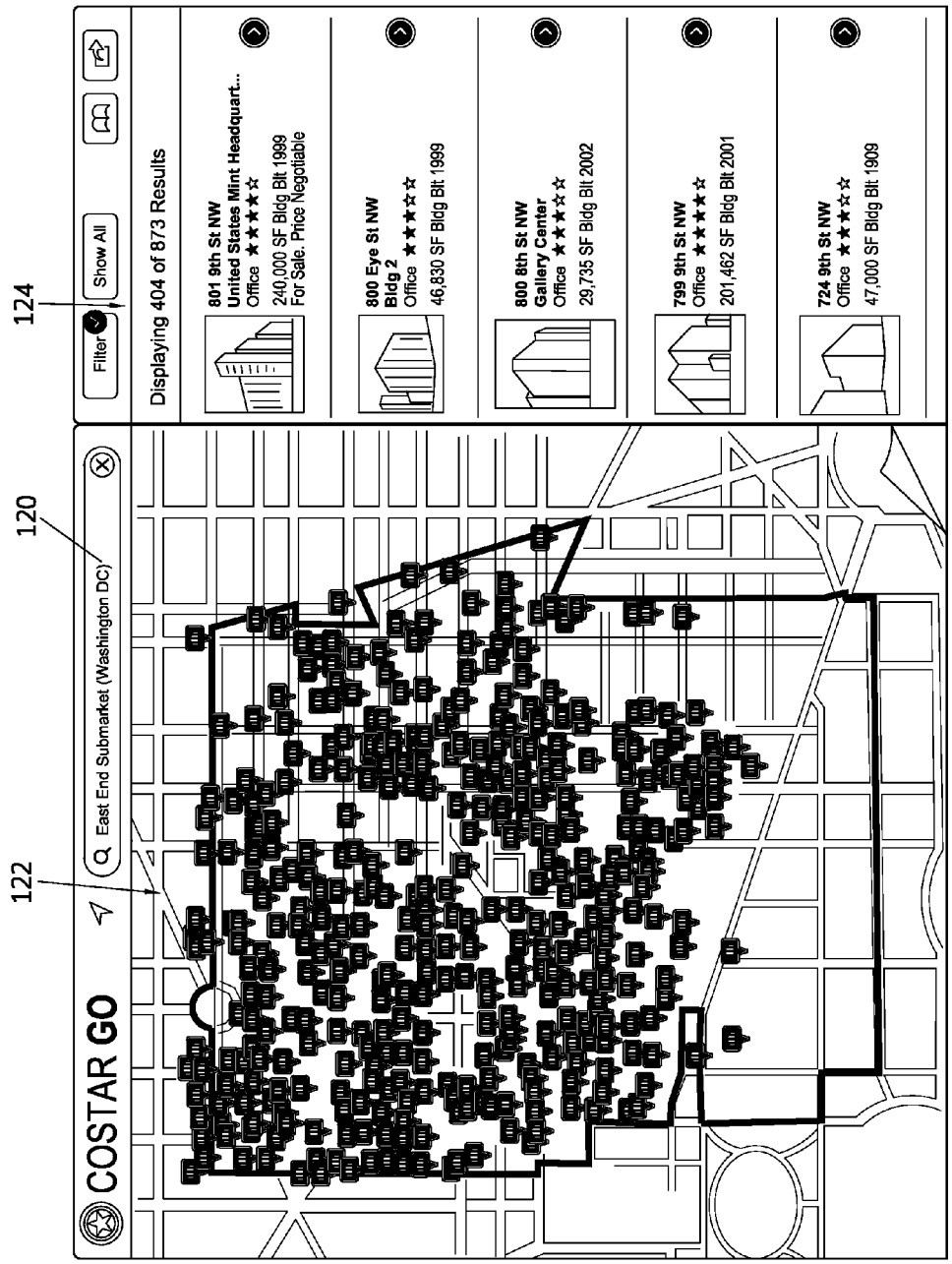
FIG. 12 shows another alternative query.

FIG. 12 shows an alternative way to enter a query. Query 120 is entered as a submarket/neighborhood name, without a specific street or street number address. The query results shown in map window 122 and record window 124 represent properties that are located in the submarket. Also, submarket boundaries are shown. In this manner, a user can locate and analyze properties in a submarket. Also, navigation can be accomplished in a manner similar to that described above. Of course, filters and sorting options can also be selected and applied to the results. To accommodate this query, database 14 can include boundaries of submarkets and can use the boundaries as a filter on the search query/results. To accomplish a submarket search, a spatial query is applied against a SQL server database to effect a point in polygon (PIP) algorithm against the properties in the search results. The PIP algorithm can be applied when the property is first entered in the database. This approach works well for a search relating to a predefined submarket. Also, the PIP algorithm can be applied at the time of the search. This approach works best for custom polygon searches or other searches of areas that are not predefined in the database.

Figure 13:
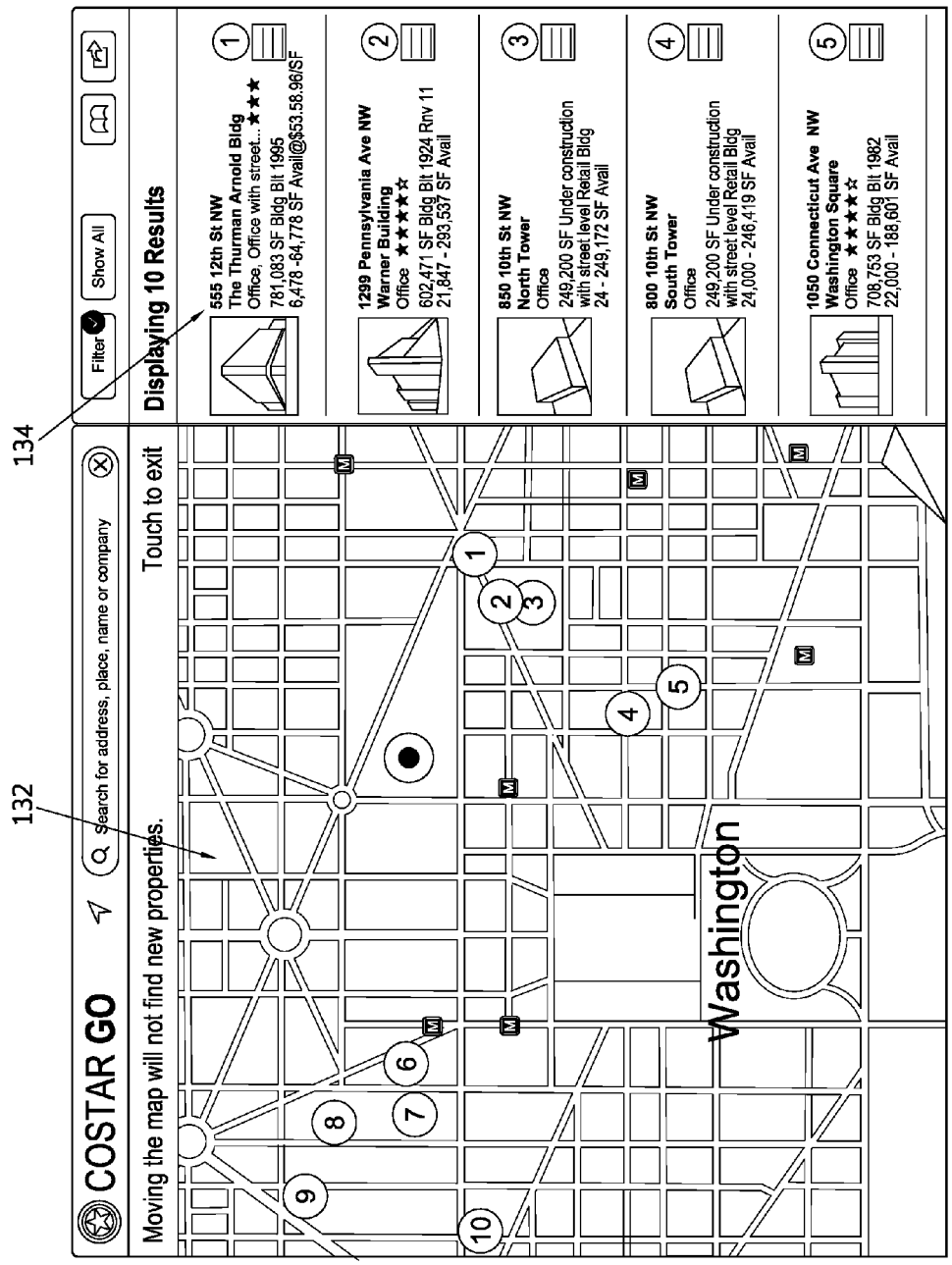
FIG. 13 is a custom tour creation screen.

FIG. 13 illustrates a screen for creating a custom tour. For example a broker may want to select specific properties for physical visit by a client, such as a potential lessee. The custom tour can start with any query, having filters satisfying user criteria for example. The tour can be loaded into a tour application and used on a mobile device to guide and supplement a physical tour of the selected properties. The tour creator can select specific properties from the search results through known user interface actions such as tapping on the touch screen in the map or records window. Once the properties are selected, a Create Tour action can be selected from a drop-down list or other user interface action. The results map of such a selection are illustrated in FIG. 13 in which selected properties are illustrated in map window 132 and in record window 134. Note that the icons in map window 132 are numbered in order of intended visit to the property on the tour. The order of the properties can be easily changed, by dragging the records displayed in records window 132 for example.

Once the tour is set, the tour creator can load the tour into a tour application to be used by the potential lessee, or other consumer, during the physical tour. The tour application will have only data for the properties in the tour. This creates a subset of the database for use during the tour that will guide and supplement the tour without extraneous data that tends to confuse the tour or lose the focus of the potential lessee or other client. The tour can be published to a web site for download. The reader application and can be branded for the tour creator. Other aspects of navigating and using the reader application can be the same as the app described above.

Figure 14:
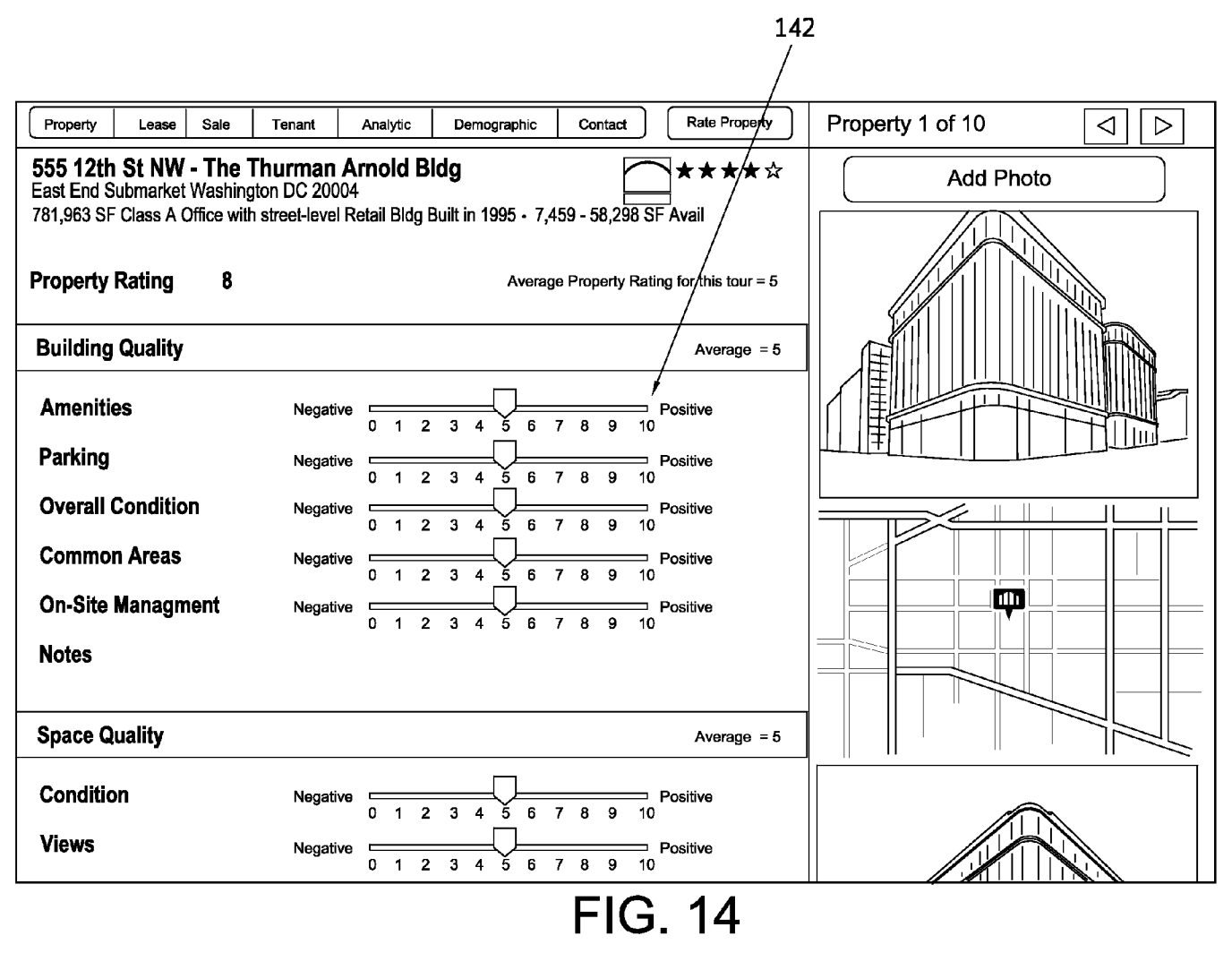

Additionally, the tour reader application can include various mechanisms for the tour participants to annotate the tour. FIG. 14 illustrates a screen for the tour participants to rate a property on the tour during the tour in real time. Slide bars 142 allow the participant to rate, Amenities, Parking, Condition, Common Areas, On-Site Management and other attributes on a 1-10 scale while they are visiting the property on soon thereafter. Of course, rating can be accomplished for each property on the tour and can include any attribute of the property or neighborhood, market, or the like. Various known user interface elements can be used to allow rating entry, such as radio buttons, number entry, icon selection, speech recognition, text boxes for notes, or the like.

Figure 16:
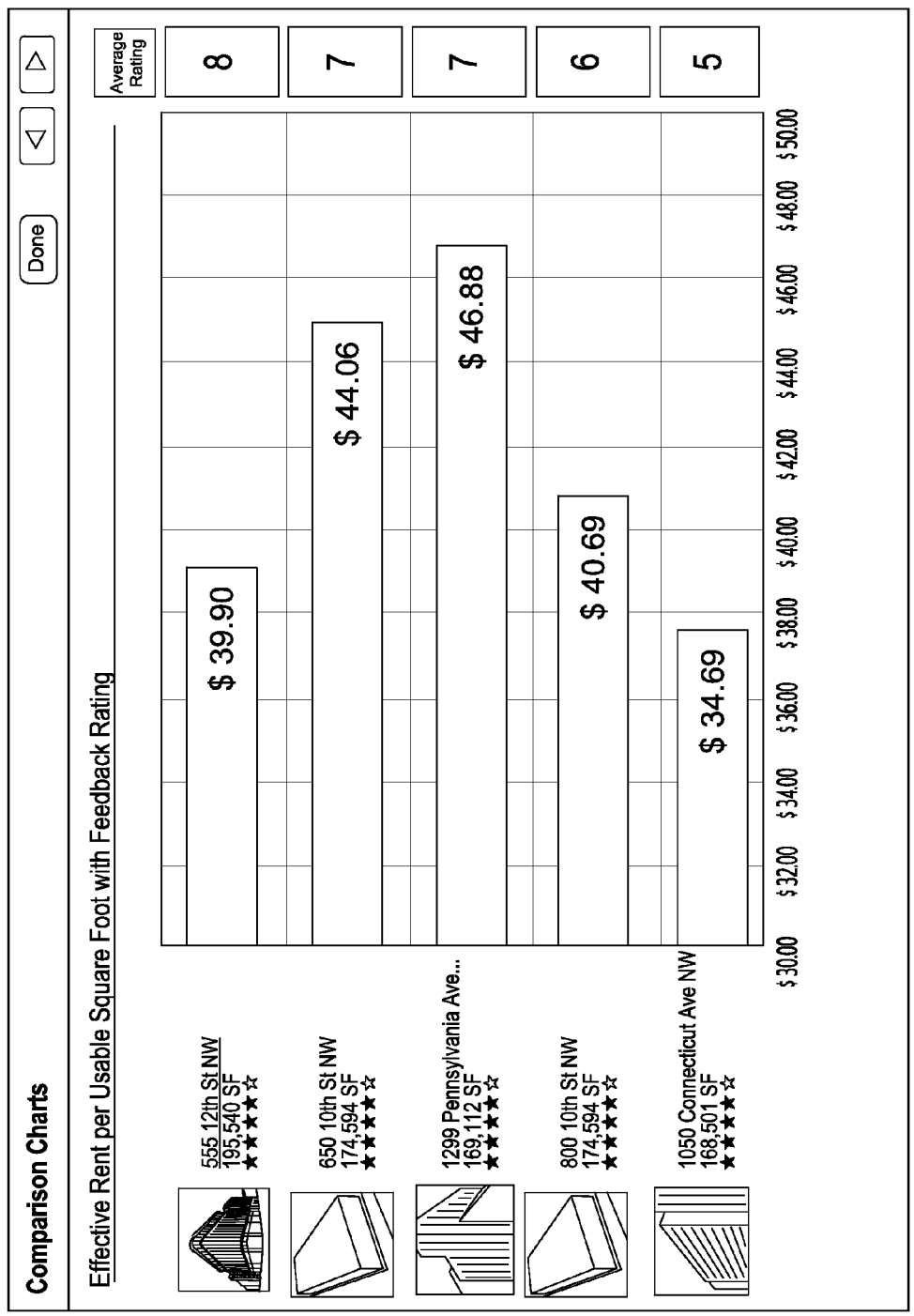
FIG. 16 is rental rates comparison screen.
Figure 17:
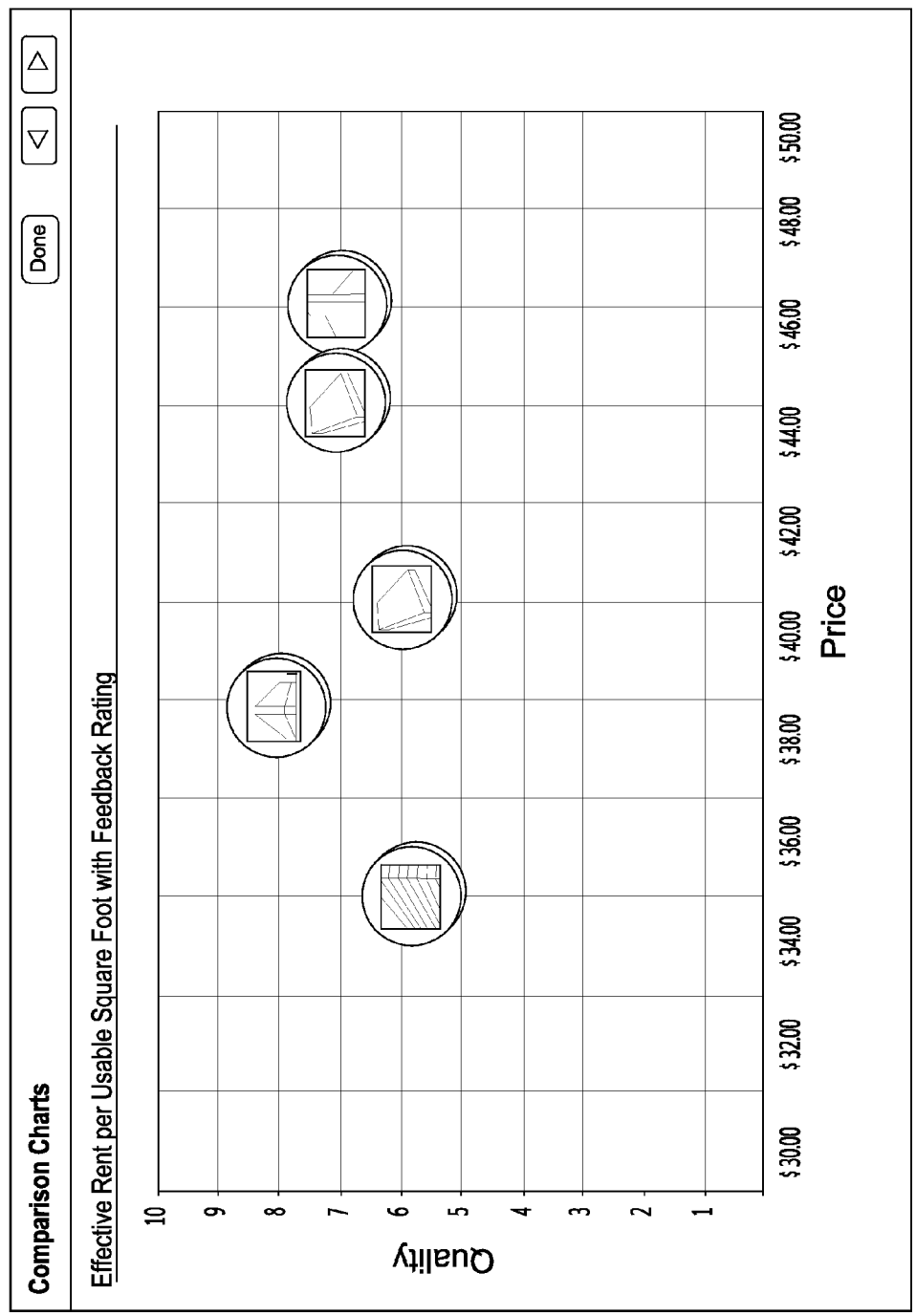
FIG. 17 is a screen showing rental rates plotted against ratings.

Various analytics can be accomplished during or after the tour. FIG. 15 illustrates a rating comparison screen which presents ratings of several properties on a tour back to the participant for review, editing, and/or decision making FIG. 16 illustrates a screen showing rental rates for properties on the tour for comparison. FIG. 17 illustrates a screen showing rental prices plotted against overall quality determined based on the participant rankings Tours can be updated in real time by applying a query or filter to the data in the tour data set. For example, a tour participant may want to take a second visit to only properties that they rated highly in the property management category. A filter can be applied and the tour updated to include only those properties.

Figure 18:
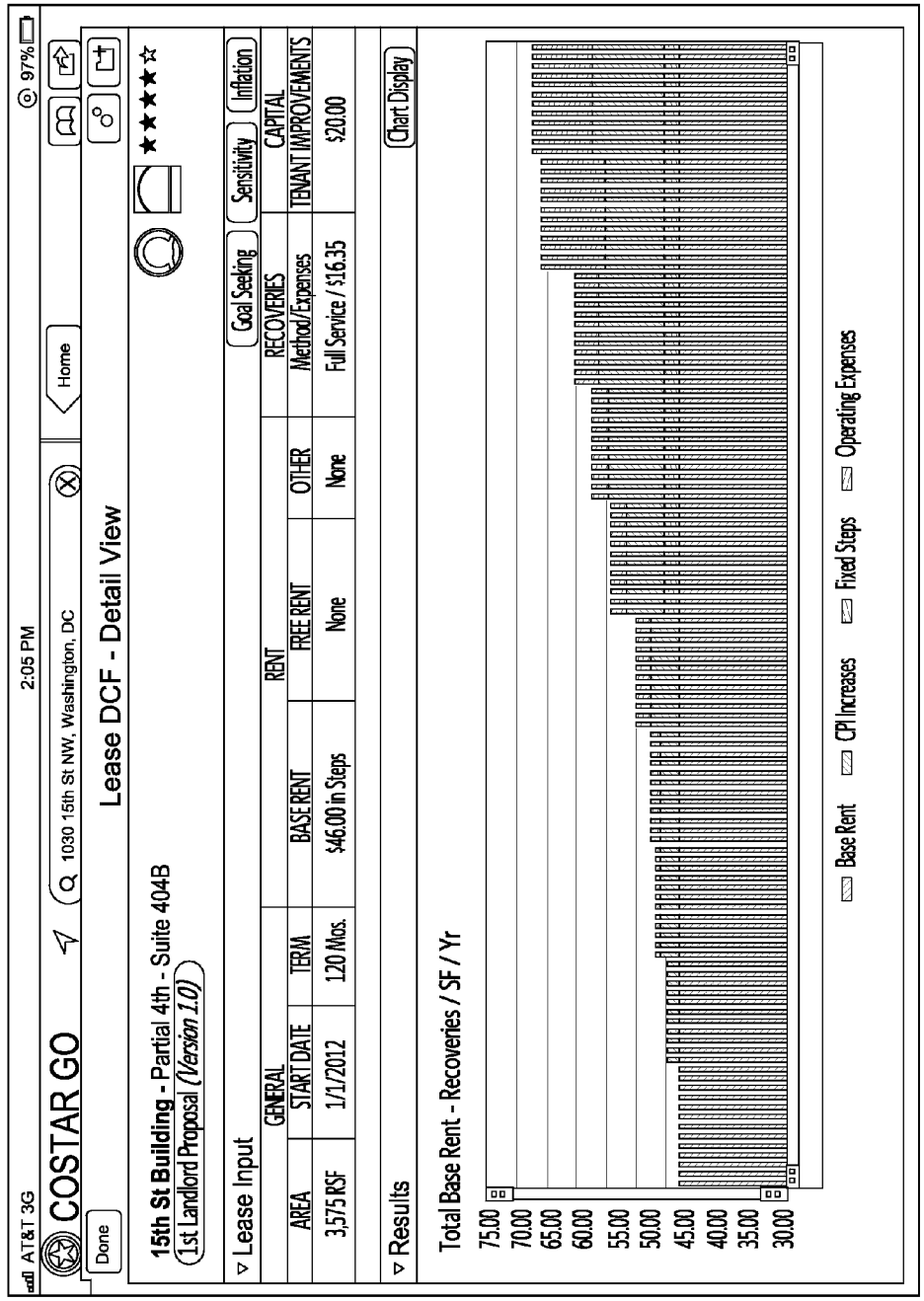
FIG. 18 is a cash flow screen.

It is known to represent a real estate lease, which is a cash flow over time, as a present value using Discounted Cash Flow analysis (DCF). U.S. Published Patent Application No. 20100063921 discloses methodologies for performing lease-by-lease cash flow analysis to evaluate real estate based securities. The disclosed embodiment uses known analysis techniques and algorithms and presents the results in a way that allows the user of a mobile device to efficiently utilize the information for making lease or purchase decisions. FIG. 18 illustrates a screen showing a cash flow for a property resulting from a search query or from a tour. The cash flow is broken down into various components, such as Base Rent, Consumer Price Index (CPI) Increases, Fixed CPI Steps, and Operating Expenses, all graphed over time in a stacked manner. This allows the user to easily understand the components and magnitude of the cash flow, even on a relatively small screen.

Figure 19:
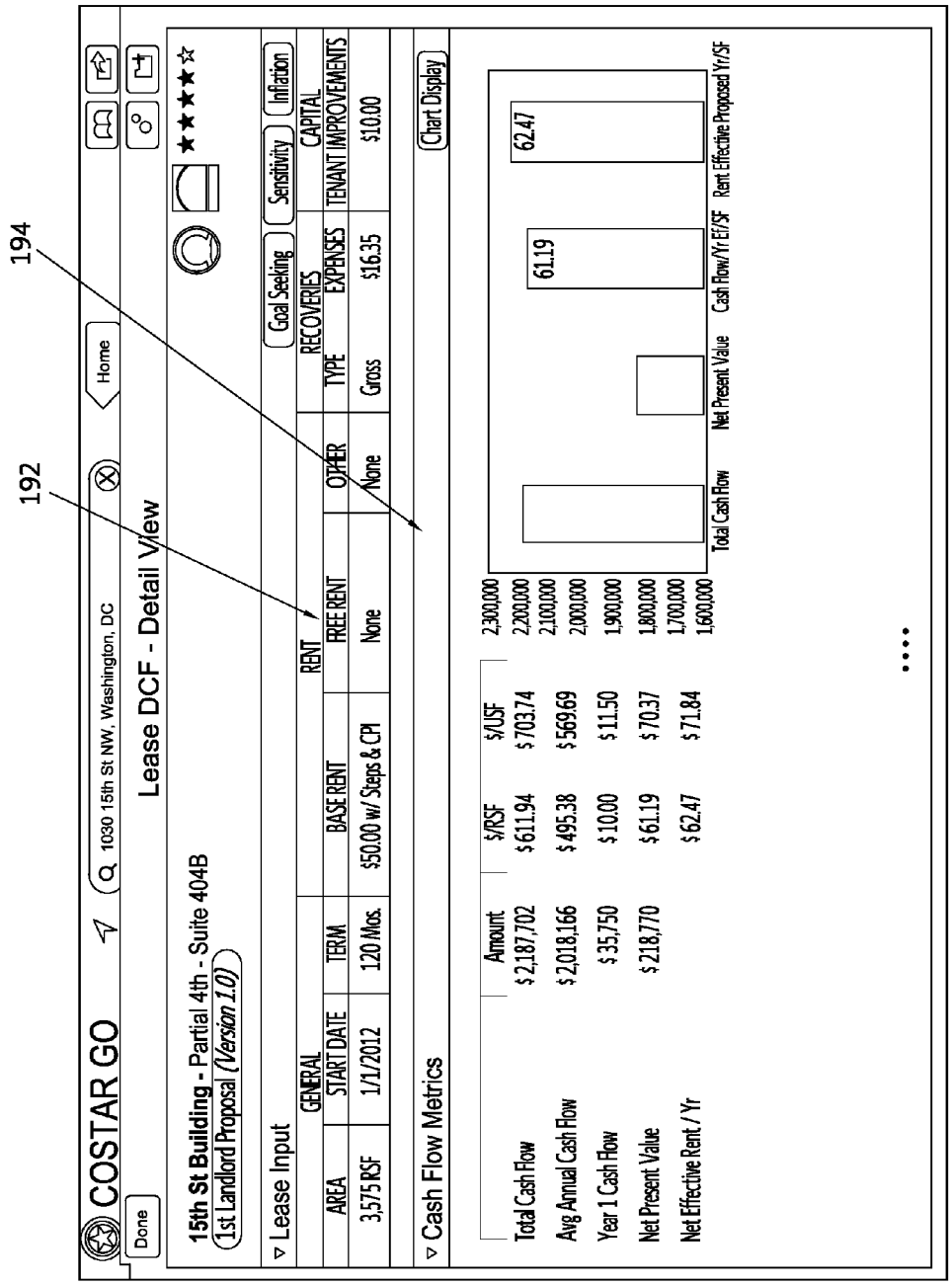
FIG. 19 is a Lease Discounted Cash Flow screen.

FIG. 19 illustrates a screen showing Lease Discounted Cash Flow (LDCF) information for a property. In window 192, the screen displays lease information, such as Area of the leased space, Lease Start Date, Lease Term, Base Rent and CPI steps, other expenses, improvements, and the like. Window 194 displays corresponding cash flow metrics calculated from the lease information and other economic assumptions. For example, the cash flow metrics can include Total Cash Flow, Average Annual Cash Flow, Year 1 Cash Flow, Net Present Value, and Net Effective Yearly Rent. Window 196 can display these same metrics in a bar chart, only some of which are shown in FIG. 19.

Figure 20:
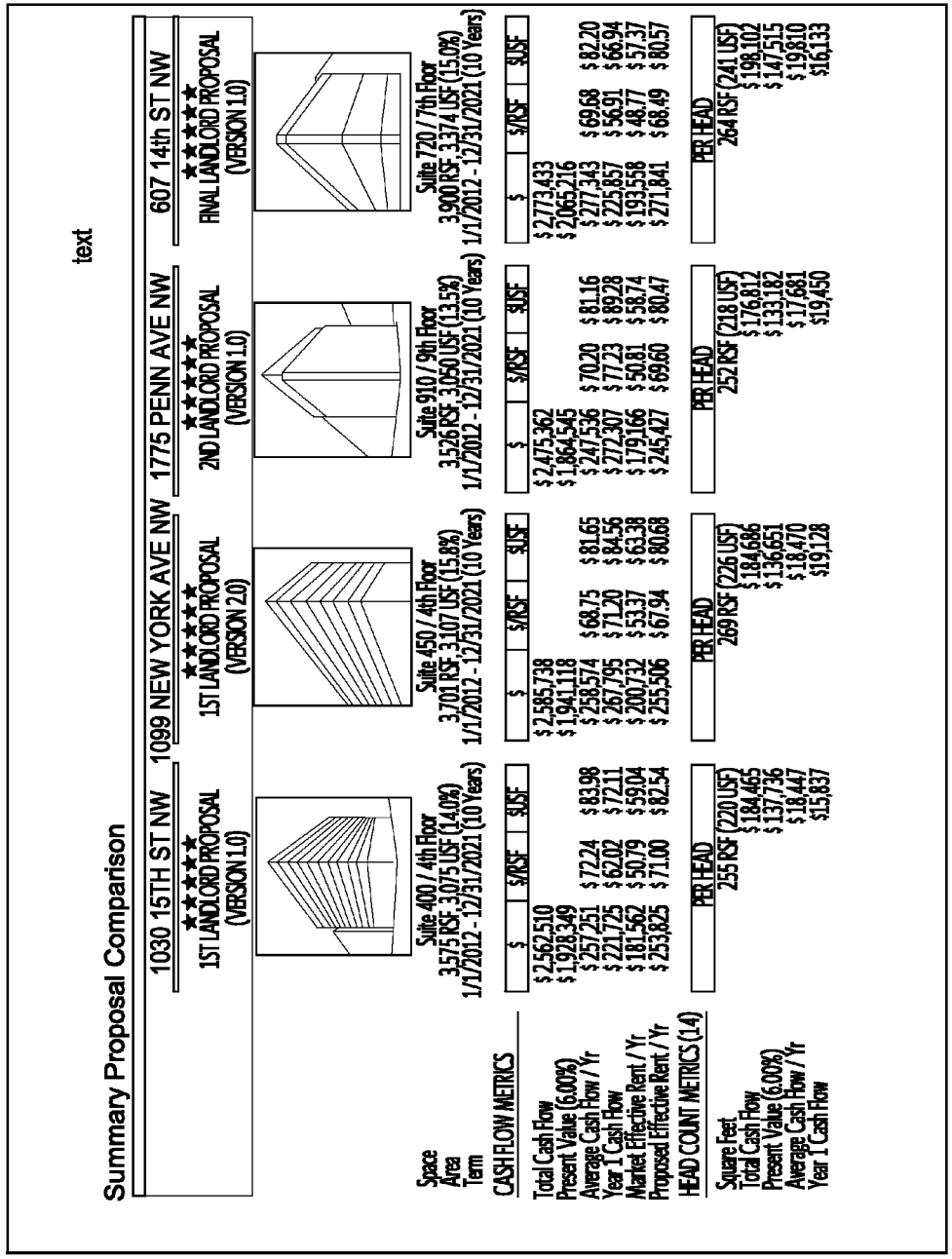
FIG. 20 is a Lease Discounted Cash Flow comparison screen.

FIG. 20 illustrates a LDCF comparison screen showing some of the data and metrics of FIG. 19 for multiple properties selected by the user along with an image and property overview information. The layout of FIG. 20 allows a user to easily compare LDCF information and property information, even on a relatively small display.

The disclosed embodiment is directed to a mobile device, such as a smart phone or a tablet computer, and addresses many limitations of such devices. One problem with such devices is displaying a vast amount of data on a relatively small screen. Also, processing large amounts of data over mobile connections presents bandwidth considerations. For example, if a user were to map all office buildings in Manhattan in New York City on a mobile device, the resulting map window would display thousands of building icons all over-plotting one-another. Many building locations would be hidden under other building locations and would be invisible and inaccessible to the user. The symbolization likely would be so dense that the underlying map would be completely obscured. Also, downloading such a large result set would be detrimental to performance of the mobile application.

To overcome these problems, the embodiment utilizes "over-post reduction" techniques to return a representative set of properties that minimizes map symbol over-plotting. The term "over-post reduction", as used herein, refers to a technique that reduces the number of geographic locations returned from a data service for display in a real estate map, so that the locations are geographically culled in order to prevent excessive over-plotting on the map. The disclosed methodology ensures that the results are culled in such a way as to preserve a representative geographic distribution of the locations.

The visible viewing area of the map, for example in map window 22 of FIG. 2, is divided into a number of resources, by process manager 18 of FIG. 1 for example, that can only be used once. These resources are translated into geographic regions, such as quadrangles or other regions, in the data service (latitude/longitude quadrangles), by process manager 18 for example. The SQL statement resulting from a query is modified and designed to return a single result for each quadrangle. The resource size is translated into a quadrangle size using the following information:

The width and height of the map viewing area in points or pixels.

The resource size in points or pixels, usually related to the size of an icon placed on the map to represent the geographic location. This resource size can be tuned to increase performance, and to hide or show more data.

The map geographic region, which is a range of latitude and longitude.

The quadrangle size contains:

LatitudeDelta—A typical difference in latitude from bottom to top for a resource LongitudeDelta—A typical difference in longitude from left to right for a resource Potential query results are grouped by the quadrangle which approximates the geographic location of the result. Only the top "n" results in the group are returned. For example, n can equal 1. However, the value of n can be adjusted to return desirable results. An example of a statement resulting from a user query utilizing over post reduction is set forth below:

```
DECLARE @MaxLon float,—maximum longitude for
    map window
@MinLon float,—minimum longitude for map window
@MaxLat float,—maximum latitude for map window
@MinLat float—minimum latitude for map window
DECLARE @ResourceWidth int—width in points or pixels of resource
DECLARE @ScreenWidth int—width in points or pixels
    of screen
DECLARE @ScreenHeight int—height in points or pixels
    of screen
SET @MinLon=-125.0
SET @MaxLon=-67.0
SET @MinLat=30.0
SET @MaxLat=49.0
SET @ResourceWidth=48
SET @ScreenWidth=800
SET @ScreenHeight=600
DECLARE @NumIconsX int
DECLARE @NumIconsY int
DECLARE @LongitudeDelta decimal(12,7)
DECLARE @LatitudeDelta decimal(12,7)
SET @NumIconsX=@ScreenWidth/@ResourceWidth—
    number of 48 pixel icons that can fit across 800×600 map
    window
SET     @NumIconsY=@ScreenHeight/@Resource-
    Width—number of 48 pixel icons that can fit from top to
    bottom 800×600 map window
SET  @LongitudeDelta=(@MaxLon-@MinLon)/@NumIconsX
SET  @LatitudeDelta=(@MaxLat-@MinLat)/@NumIconsY
print @LongitudeDelta
print @LatitudeDelta
SELECT min(sp.PropertyID) as PropertyID,
count(*) as regioncount,
FLOOR(sp.Latitude/@LatitudeDelta) as latitudekey,
FLOOR (sp.Longitude/@LongitudeDelta) as longitudekey
FROM SearchProperty sp with (nolock)
WHERE (sp.latitude between @MinLat and @MaxLat)
    and
    (sp.longitude between @MinLon and @MaxLon)
group by FLOOR(sp.Latitude/@LatitudeDelta),
    FLOOR (sp.Longitude/@LongitudeDelta)
```

The basic overpost reduction technique described above can be improved to correct potential user interface anomalies. For example, the basic technique could result in specific properties disappearing when the user zooms on a map window. To minimize this, the embodiment utilizes stepped quadrangle sizes rather than gradually changing quadrangle sizes.

Intuitively, the user expects to see more detail as they zoom the map closer. The size of the quadrangles can be stepped at certain thresholds to guarantee that properties don't disappear. As the zoom level crosses the threshold to the next smaller quadrangle size, each quadrangle is divided into 4 smaller quadrangles. This guarantees that the new smaller quadrangles cannot overlap any boundaries of the old larger quadrangles, and no properties disappear when zooming in.

Also, when a user does a street name search, they intuitively expect to see a graphic representation of all the properties along the street, without the thinning effect caused by the over-post reduction process. To satisfy this, the embodiment automatically increases the over-post granularity by four times when a street search is specified. This allows for a more intuitive user experience as the map more accurately represents the density of properties along the street rather than sparsely dotting them. There is no significant performance degradation since the rest of the map not near the requested street is empty.

Further, the basic algorithm can occasionally create anomalies where individual properties would appear or disappear as the user panned the map at close zoom levels. This can be avoided by not using over post reduction at the default zoom level, This gives users confidence that they can always see all qualifying properties at this zoom level, and eliminates the problem of losing properties when panning at close zoom levels.

In cases where properties are highly concentrated, like the downtown area of major cities, over-post reduction can work too well, and render an unexpectedly small number of results on the map. At some zoom levels the map can look sparsely populated even though the user knows that a large number of properties actually exist. The embodiment displays at least a minimum number of property results at all times after over-post reduction is applied to avoid this problem. The minimum number is configurable but could be set to 250, for example. The search query re-searches multiple times with smaller quadrangle sizes until the minimum is met.

Because both Tenant and Lease Deals frequently produce multiple results for each property shown on the map, situations arise in which as many as 10,000 of these entities were returned for just a few hundred properties. This can significantly degrade performance and exceed the number of results that a user would want to scroll through in the records window. Accordingly, the embodiment can employ an Entity Max of 1000 for these search types. If more than 1000 Tenants or Lease Deals meet the criteria, only 1000 are shown to the user. The algorithm always keeps at least one entity per property (unless there are >1000 properties) and eliminates them based on a sorting criteria that the user selects. This approach keeps the most interesting records at the top of the list.

Similar concepts can be applied to search results other than property mappings. For example, when showing tenant or lease deals for a property, the maximum number of results can also be limited. Both in cases when over-posting is and is not used, if more than, for example 1000 Tenants or Lease Deals meet the criteria, only 1000 can be shown. The algorithm preferably keeps at least one entity per property (unless there are >1000 properties) and eliminates them based on a sorting criteria, like space occupied or lease sign date, giving priority to items with a higher sort value. Over-post processing can be accomplished by client device 12 and/or server device 10.

The embodiment uses novel query optimization techniques to improve performance. The SQL Server database server caches query execution plans to prevent unnecessary recompilation of common queries. Cached execution plans would sometimes only be effective at certain zoom levels, causing significant performance problems for users doing similar searches at different zoom levels. To avoid this problem, the embodiment adds commented out text, including the zoom level, into the dynamically created queries. This causes the SQL Server to separately cache execution plans based on zoom levels.

Further, multiple dynamic query creation and execution in the database layer and other performance enhancing techniques are used. Search queries are dynamically generated in real time by a single call to a stored procedure. The queries are executed dynamically using sp_executesql, which allows for query plan reuse without having to maintain thousands of separate stored procedures. Separate dynamic SQL templates can be established to handle the different functional and performance needs of different search types. Each template is finely tuned for performance using temp tables, "SELECT INTO" strategy, common table expressions, ROW_NUMBER( ) function, while loops, and query hints as appropriate. Non-property searches use indexed views to increase performance without needing to maintain denormalized property data on non-property search tables.

In order to facilitate query entry, especially on resource constrained mobile devices, the disclosed embodiment enables users to input search text to find zip codes, buildings by name, properties by an address, building parks, shopping centers, cities, submarkets, streets grouped by core based statistics area (CBSA), counties, states, countries, companies, and contacts. Processing of user entered queries can be accomplished at the client device 12, by app 16, or at server 10, by process manager 18. Before implementing any search, the user input is cleansed. Input is cleansed by removing all leading whitespace, consolidating consecutive whitespace characters into a single space character, and converting the text to all lower cased characters. The indexes of database 14 will only be searched if the cleansed input contains at least three non-whitespace characters. An empty list of result objects are returns when the cleansed input contains fewer than three non-whitespace characters.

In parallel, all indexes of database 14 are searched using an index specific search object. Using regular expressions, the search object validates that the cleansed input is a possible search term. If the term is valid, then a search statement is prepared. The executed statement returns a collection of preferred and non-preferred matched results. Matches are preferred when they fall into the user's preferred market. If the user's current physical location is known, through GPS or the like, then the preferred market primary research market the user is located in. Otherwise the preferred market is based upon the user's preferences. If the current location is unknown and the user hasn't specified a primary market in their preferences, the preferred market can default to the research market that the user's office is located in.

The above-noted indexes are can be specialized full-text search indexes constructed for the following entity types: building names, building park names, city names, company names, contact names, country names, county names, postal codes, zip codes, property addresses, market names, submarket names, shipping center names, region names, state names, or any other parameter that is to be searched.

Once all of the index searches have returned, the preferred results are processed in parallel. The results are processed by converted the matched result into an object that contains a structured text for display. The processed preferred results are subsequently sorted. If the number of preferred results is less than the maximum number of matches to return, the non-preferred matched results are processed and sorted using the same logic as the preferred matches. The processed non-preferred matches are appended to the list of processed and sorted preferred matches. The combined processed search results but no more than the maximum number of matches are returned to the user. In this manner, user queries can be "auto-filled" during entry to suggest queries that are most relevant. For example, if a user begins to enter a query that is known in the market as a street name, the query will be "auto-filled" with the street. However, the same query could be known in another market as a building. In this case, the query would be auto-filled as the building. Suggested queries can be prioritized for display in the following manner, listed from highest priority to lowest priority; Property Address, Geographic Code for Address or Cross Street, Country, Zip Code, City, State, Submarket, Market, Shopping Center Name, Building Park, Building Name, Street Name, Contact, Company, County.

Figure 21:
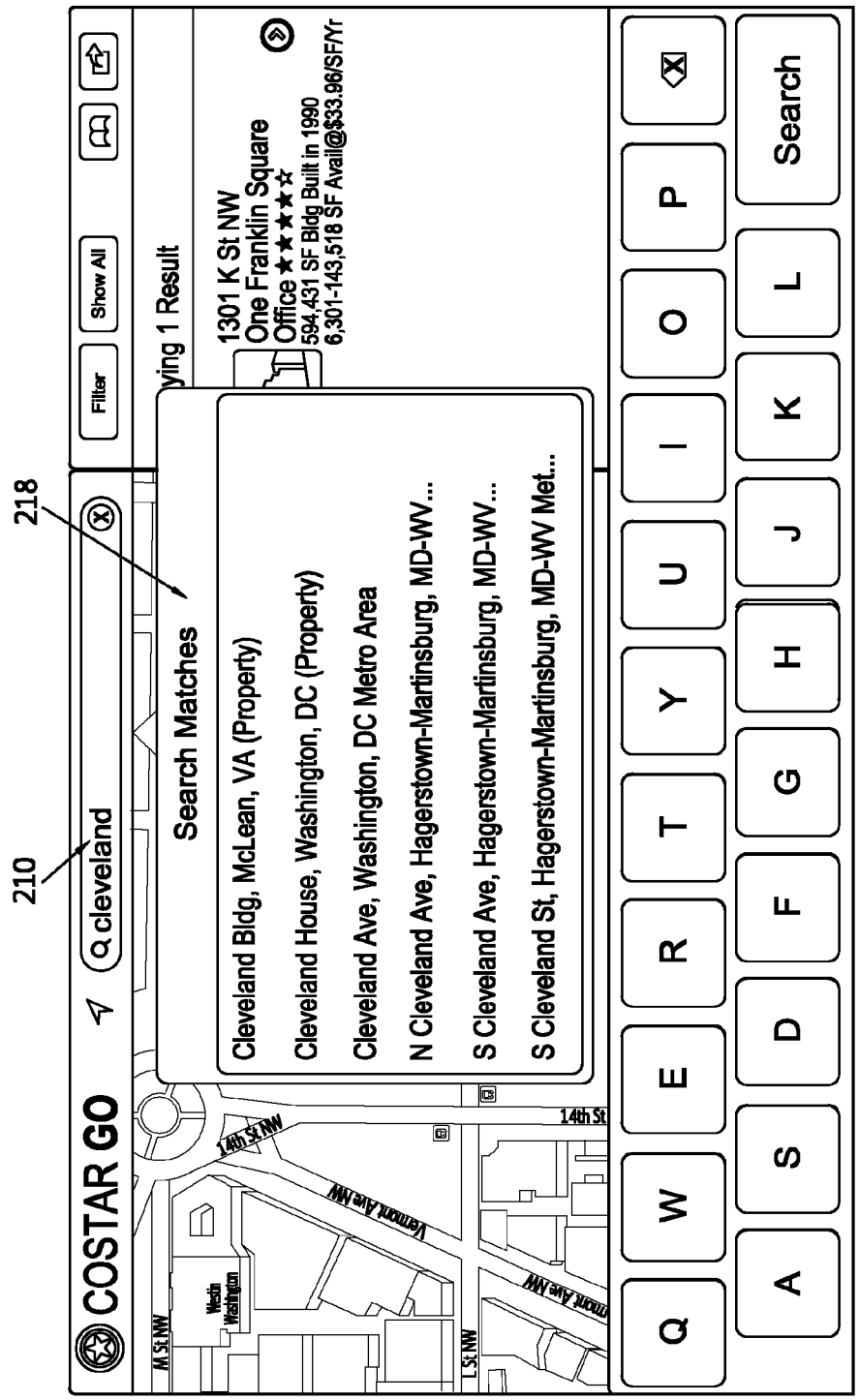
FIG. 21 is a screen showing a query matching window.

FIG. 21 illustrates a partial query of "Cleveland" being entered into query window 210. Note the search match window 218 has appeared and has suggested potential queries based on property records in database 18 that are in the local market, Washington, D.C. in this example. With conventional auto-fill, suggestions, such as "Cleveland, Ohio" would be expected. Instead, more helpful, local suggestions, such as "Cleveland Ave." are provided to the user. The disclosed embodiment thus facilitates intelligent query entry for mobile devices by leveraging the information provided by client device 12 and/or server device 10 thus reducing the need for the user to enter precise and complete queries. Further, queries can be presented based on geographic database subscription limits.

The computing devices disclosed herein include one or more processors designed to process instructions, for example computer readable instructions (i.e., code) stored on a tangible storage device. By processing instructions, the processors perform the steps and functions disclosed herein. Storage devices may be any type of storage device (e.g., an optical storage device, a magnetic storage device, a solid state storage device, etc.), for example a non-transitory storage device. Alternatively, instructions may be stored in one or more remote storage devices, for example storage devices accessed over a network or the internet.

A disclosed embodiment has been described. However, the invention is not limited thereto and includes all variations and equivalents as would be known to one of skill in the art and within the scope of the appended claims.

What is claimed:

1. A computer system for providing real estate data to a user on a mobile device having a touch screen user interface, the system comprising:
a mobile client device having a touch screen display, a processor, a non-transitory memory and instructions stored in the memory in the form of an app, the instructions, when executed by the processor, cause the client device to:
receive a query from a user;
transmit the query to a server, the server having a database of real estate data stored in the form of property records;
receive, from the server, data related to property records that satisfy the query;
receive map data for a geographic region corresponding to the property records;
create formatted data to be displayed on the touch screen user interface including receiving information corresponding to a set of the property records each having an associated geographic location, determining the size of a map viewing area to be viewed on the touch screen user interface, determining a size of at least one graphical indicator, determining a geographic region of the map viewing area, determining plural geographic sub-regions within the geographic region based on the size of a map viewing area, the size of the at least one graphical indicator, and the geographic region, and designating a maximum number n of graphical indicators in a given geographic subregion to be displayed on the touch screen user interface for each of plural subsets of properties in the given geographic subregion; and
display the formatted data in a map window on the touch screen user interface, including displaying n graphical indicators on a geographic map in each of the geographic subregions to thereby limit the number of graphical indicators displayed on the touch screen user interface for at least a subset of the properties corresponding to the property records satisfying the query.

2. The system as recited in claim 1, wherein a record window displaying textual and image information for at least two of the properties corresponding to the property records satisfying the query is displayed on the touch screen user interface simultaneously with the map window.

3. The system of claim 1, wherein the geographic region is defined by a latitude delta and a longitude delta.

4. The system of claim 1, wherein n equals 1.

5. A computer implemented method for providing real estate data to a user on a mobile device having a touch screen user interface, the method comprising:
receiving, by the mobile device, a query from a user;
transmitting, by the mobile device, the query to a server, the server having a database of real estate data stored in the form of property records;
receiving, from the server, data related to property records that satisfy the query;
receiving map data for a geographic region corresponding to the property records; and
create formatted data to be displayed on the touch screen user interface including receiving information corresponding to a set of the property records each having an associated geographic location, determining the size of a map viewing area to be viewed on the touch screen user interface, determining a size of at least one graphical indicator, determining a geographic region of the map viewing area, determining plural geographic sub-regions within the geographic region based on the size of a map viewing area, the size of the at least one graphical indicator, and the geographic region, and designating a maximum number n of graphical indicators in a given geographic subregion to be displayed on the touch screen user interface for each of plural subsets of properties in the given geographic subregion; and
displaying the formatted data in a map window on the touch screen user interface, including displaying n graphical indicators on a geographic map in each of the geographic subregions to thereby limit the number of graphical indicators displayed on the touch screen user interface for at least a subset of the properties corresponding to the property records satisfying the query.

6. The system of claim 1, wherein the size of the geographic region is determined each time a map viewing area is changed.

7. The method of claim 5, wherein n equals 1.

8. The method as recited in claim 5, wherein a record window displaying textual and image information for at least two of the properties corresponding to the property records satisfying the query is displayed on the touch screen user interface simultaneously with the map window.

9. The method of claim 5, wherein the geographic region is defined by a latitude delta and a longitude delta.

\* \* \* \* \*